(No Model.)
J. LEEMBRUGGEN.
RECEPTACLE FOR FOOD, &c.
No. 550,183. Patented Nov. 19, 1895.
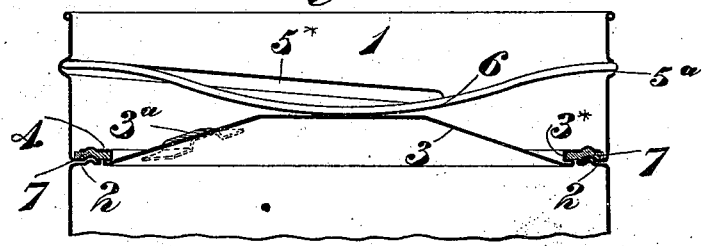
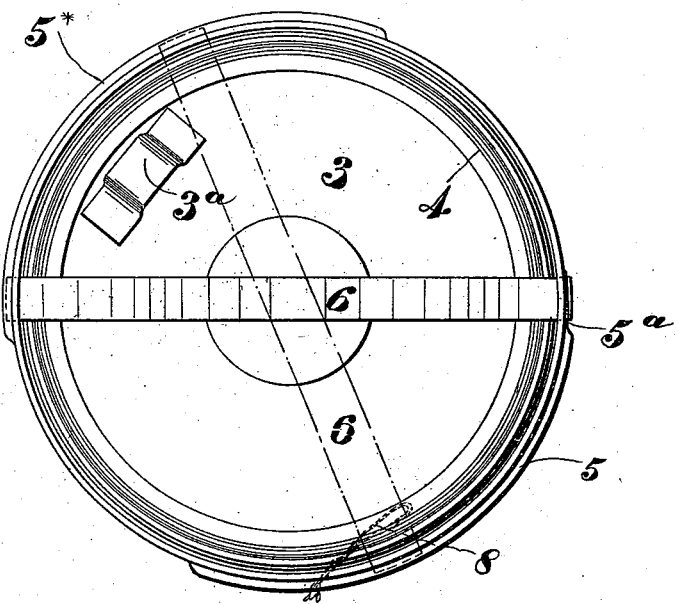
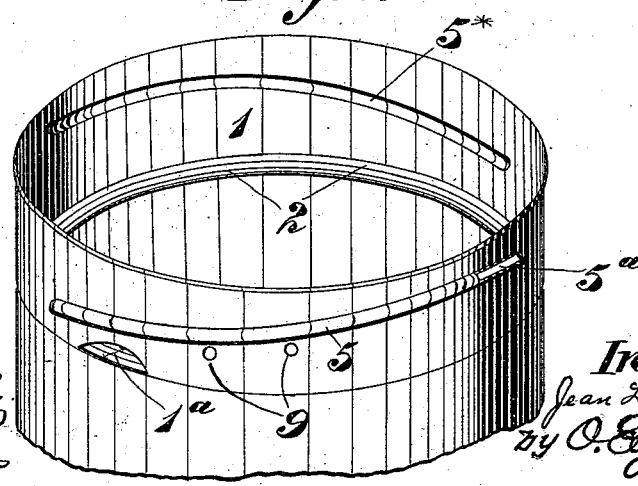
Witnesses.
E. C. Duffy
J. F. Oehmsen
Inventor.
Jean Leembruggen
By O. E. Duffy
Attorney

UNITED STATES PATENT OFFICE.

JEAN LEEMBRUGGEN, OF AMSTERDAM, NETHERLANDS.

RECEPTACLE FOR FOOD, &c.

SPECIFICATION forming part of Letters Patent No. 550,183, dated November 19, 1895.

Application filed June 14, 1894. Serial No. 514,543. (No model.) Patented in Belgium September 25, 1891, No. 96,525; in France October 19, 1891, No. 216,843; in England November 29, 1892, No. 21,821; in Switzerland January 3, 1893, No. 6,048, and in Canada March 27, 1894, No. 46,540.

*To all whom it may concern:*

Be it known that I, JEAN LEEMBRUGGEN, a subject of the Queen of the Netherlands, residing at 9 P. C. Hooftstraat, Amsterdam, in the Kingdom of Holland, have invented Improvements in Receptacles for Food and other Substances, (for which I have obtained Letters Patent in Canada, No. 46,540, dated March 27, 1894; in England, No. 21,821, dated November 29, 1892; in Switzerland by patent of addition No. 6,048/159, dated December 30, 1893, to principal patent No. 6,048, dated January 3, 1893; in France by patents of addition dated January 23, 1893, November 11, 1893, and February 2, 1894, to principal patent No. 216,843, dated October 19, 1891, and in Belgium by patents of addition dated October 21, 1892, No. 101,800, November 7, 1893, No. 107,044, and February 1, 1894, No. 108,355, to principal patent dated September 25, 1891, No. 96,525,) of which the following is a specification.

This invention has reference to improved constructions of food and other receptacles and covers therefor, and to means for holding the covers in place and for preventing the covers being removed without detection, as I will now proceed to explain, referring for this purpose to the accompanying drawings, in which—

Figure 1 is a vertical section of the upper part of one form of receptacle and cover with closing device constructed according to this invention, and Fig. 2 is a plan thereof. Fig. 3 is a perspective view of the upper portion of the receptacle, the cover being removed.

1 is the upper part of a receptacle that may be of any suitable material—as, for example, sheet metal, as shown. It is provided with an inwardly-projecting rib or flange 2 in the form of a ring, which may conveniently be produced by forming in the said upper part 1 of the receptacle, before the bottom is attached, an inwardly-projecting rib of curved form in cross-section and about one centimeter deep, and afterward compressing this rib between dies, so as to bring its upper and lower portions into contact with each other. In the drawings the said two portions are, for the sake of clearness, shown slightly separated. The said rib or flange 2 (hereinafter called a shoulder) may, as shown, be formed with an upwardly-projecting ridge or bead, produced by grooving it on its under side.

3 is the receptacle cover, made of dished or domed shape, the convexity being uppermost. This cover is formed at its periphery with a circular raised rim 4, fomed with a groove to correspond with the ridge or bead on the shoulder 2. The said shoulder and rim, instead of being formed as shown, may, if desired, be made flat or of other form.

$3^a$ is a small loop or bent piece of metal secured on the cover to facilitate the handling of the same.

5 $5^*$ are grooves formed in the wall of the receptacle above the shoulder 2 to receive the ends of a holding-down device consisting of a spring 6, the middle portion of which is bent to a concave form and is arranged to press upon the top of the cover 3 and force the rim 4 thereof toward the shoulder 2.

To effect an air-tight closure, a ring or washer 7 of suitable packing material, such as plastic felt or india-rubber, is inserted between the shoulder 2 and the rim 4, the shape of each of which may be modified according to the nature of the packing material used. To enable the rim 4 to be forced upon the said washer 7 of packing material with a gradually-increasing pressure as the bent metal spring 6 is moved into its closed position, I make the grooves 5 $5^*$ downwardly-inclined or screw-like, as shown, so that while moving the spring into its closed position (shown in dotted lines in Fig. 2) the ends of the spring will be gradually moved downward, with the result that the spring will exert a gradually-increasing pressure upon the top of the cover and thereby insure a better joint between the shoulder 2, rim 4, and washer 7 than has heretofore been usual. The two grooves are of the same length and same downward inclination. They begin and end at points situated diametrically opposite and at the same height.

To make insertion and removal of the spring 6 possible a part of the beaded portion of the metal forming the groove 5 is cut away, so as to form an opening at $5^a$. In placing the spring 6 in position it is passed laterally through the opening thus formed, and one of its ends inserted in the groove 5* at a point opposite to the opening 5ª, the other end being then in a position to enter the groove 5. The spring is then partly turned in such a direction that its ends are caused to descend the said grooves 5 5*, whereby the cover will be pressed tightly down upon the shoulder 2, the cover being released by afterward moving the spring in the reverse direction.

To obviate liability of the washer 7 of packing material being mislaid when not in place within the receptacle, I form the cover 3, at or near the junction of its central and rim portions, with a circumferential groove or recess 3*, adapted to partly receive and securely hold the said washer, so as to form therewith a combined cover and packing-ring or washer that can be inserted within and removed from the receptacle as one piece. This formation of the cover is shown only in connection with a cover of circular form in plan, but it can obviously be applied to covers of other form—as, for example, square.

When the receptacles are intended to contain preserves or other substances from which the air must be excluded, they are or may be placed, after the said washer, cover, and spring are in position, in a heating medium to produce rarefaction of the air within the receptacle, after which the receptacle is suddenly cooled, whereby the cover is then forced down and held in place by the greater pressure of the external atmosphere. The temperature should be as high as possible consistent with avoiding injury to the contents of the receptacle. In order to afterward raise the cover, the spring is first removed and equilibrium of pressure on the two sides of the cover reestablished—it may be by heating the receptacle or by forming in the cover a small hole through which air can enter and which hole can be afterward soldered up when it is desired to use the cover again—after which the cover is raised by means of the bent piece 3ª, which may conveniently be done by inserting one end of the spring 6 under the same and pressing on its other end. I consider it more advantageous, however, to slightly raise the cover at one side, so as to admit air to the receptacle by inserting a suitable device, such as a knife-blade, between the rim and washer 7 and the shoulder 2. To enable this to be easily done an opening 1ª may be formed in the upper part 1 of the receptacle at a point immediately above the shoulder 2.

8 is a wire or cord by which improper opening of the receptacle without detection can be prevented when desired. This wire or cord is passed around the spring 6, and its ends, after being passed through a hole 9 (or holes) in the wall of the receptacle at a point slightly above the rim 4 of the cover, are twisted and suitably sealed—as, for example, with lead.

As will be readily seen, receptacles and covers constructed as described are simple in construction and can be cheaply made. They can be effectually closed and are thus adapted for containing substances of various kinds. They can be conveniently packed for transport, and after being wholly or partly emptied can be reused.

What I claim is—

1. A food or other receptacle comprising the receptacle proper having within its upper end a narrow internal shoulder and two downwardly inclined grooves formed in the wall of said receptacle and extending partly around the same, a cover having a rim adapted to be supported by said shoulder, and a separately detachable spring having its central portion bearing on said cover and its ends bent upwardly and engaged with said grooves so as to be held endwise therein by the walls thereof but free to be partly turned upon said cover substantially as herein described for the purpose specified.

2. A food or other receptacle having an internal shoulder 2, downwardly inclined grooves 5, 5*, a cover 3 having a central domed portion and an outer rim 4 adapted to be supported by said shoulder, a washer 7 of suitable packing material arranged between said shoulder and rim, and a bent spring 6 the ends of which are adapted to be engaged in said grooves and to be held endwise therein by the walls thereof with its central portion bent toward the interior of said receptacle and resting on the top of said cover, substantially as herein described for the purpose specified.

3. A food or other receptacle comprising the receptacle proper having within its upper end a narrow internal shoulder, and two downwardly inclined grooves formed in the wall of said receptacle and extending partly around the same, a cover having a raised central portion and an outer rim integral with each other and a circumferential groove or recess formed by and between said central portion and rim and adapted to partly receive and hold a ring or washer of packing material, a ring or washer of packing material held within said circumferential groove or recess so as to be located between the said rib and rim when the cover is in place, and a separately detachable spring having its central portion bearing on said cover and its ends bent upwardly and engaged with said grooves so as to be held endwise therein by the walls thereof but free to be partly turned upon said cover, substantially as herein described for the purpose specified.

4. A food or other receptacle having an internal rib 2, downwardly inclined grooves 5 5*, an opening 5ª in communication with one of said grooves, and an opening 1ª at a point immediately above said internal rib, a cover 3 formed with a raised central portion and a raised rim portion 4, integral with each other and having a circumferential groove or recess 3* formed by and between them, a ring or washer 7 of packing material held within said groove or recess and located between said rim and rib, and a spring 6 having its ends bent upwardly and adapted to be engaged in said grooves and to be held endwise therein by the walls thereof with its central portion bent toward the interior of said receptacle and resting on the top of said cover, substantially as herein described for the purpose specified.

In testimony whereof I have signed my name to this specification in the presence of two subscribing witnesses.

JEAN LEEMBRUGGEN.

Witnesses:
ANTON DIRK VAN DER HEYDEN,
HENRICUS JOHANNES ANTONIUS MEYER.